(12) United States Patent
Park et al.

(10) Patent No.: US 10,883,546 B2
(45) Date of Patent: Jan. 5, 2021

(54) WIDE ANGLE JOINT

(71) Applicant: MANDO CORPORATION, Pyeongtaek-si (KR)

(72) Inventors: Sung Hun Park, Anyang-si (KR); SungJune Moon, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 853 days.

(21) Appl. No.: 15/477,752

(22) Filed: Apr. 3, 2017

(65) Prior Publication Data
US 2017/0292571 A1    Oct. 12, 2017

(30) Foreign Application Priority Data

Apr. 6, 2016    (KR) .................. 10-2016-0042204

(51) Int. Cl.
*F16D 3/26*      (2006.01)
*F16D 3/84*      (2006.01)
(Continued)

(52) U.S. Cl.
CPC .............. *F16D 3/26* (2013.01); *B60G 7/005* (2013.01); *F16C 11/0623* (2013.01); *F16D 3/22* (2013.01);
(Continued)

(58) Field of Classification Search
CPC ................. F16D 3/16; F16D 3/26; F16D 3/84
See application file for complete search history.

(56) References Cited

U.S. PATENT DOCUMENTS 3,470,712 A * 10/1969 Geisthoff .................. F16D 3/32
                                                              464/118
4,799,817 A *  1/1989 Geisthoff .................. F16D 3/32
                                                              403/57
(Continued)

FOREIGN PATENT DOCUMENTS

CN     202251504 U      5/2012
CN     202851716 U      4/2013
KR     10-074670    *   7/2007   ............... F16D 3/26

OTHER PUBLICATIONS

Chinese Office Action dated Jan. 20, 2019 issued in Chinese Patent Application No. 201710221974.6 (with English translation).

*Primary Examiner* — Michael P Ferguson
(74) *Attorney, Agent, or Firm* — Morgan, Lewis & Bockius LLP

(57) ABSTRACT

The present invention provides a wide angle joint including: a pair of yoke shafts mounted on opposite sides thereof to transmit power from the one side to the opposite side, each yoke shaft having a ball end portion provided on a first yoke part to which a spider is coupled; a plate having a large-diameter part formed in the middle thereof and protruding parts protruding from the large-diameter part in the opposite axial directions while being reduced in a radially inward direction, wherein the protruding parts have insertion recesses into which the ball end portions of the yoke shafts are inserted, and the large-diameter part is faulted to have different widths in radial directions from the central portion thereof; and a pair of coupling yokes, each of which has a second yoke part connected with the first yoke part through the spider and a support recess into which the large-diameter part of the plate is inserted.

6 Claims, 6 Drawing Sheets

(51) Int. Cl.
*F16D 3/22* (2006.01)
*B60G 7/00* (2006.01)
*F16C 11/06* (2006.01)

(52) U.S. Cl.
CPC .... *B60G 2204/416* (2013.01); *F16C 2326/05* (2013.01)

(56) References Cited

U.S. PATENT DOCUMENTS

| | | | | |
|---|---|---|---|---|
| 5,419,740 A * | 5/1995 | Koyari | ...................... | F16D 3/32 464/118 |
| 6,840,864 B2 * | 1/2005 | Dupuie | ..................... | F16D 3/33 403/205 |
| 9,228,614 B2 * | 1/2016 | Lee | ........................... | F16D 3/32 |

* cited by examiner

WIDE ANGLE JOINT

CROSS REFERENCE TO RELATED APPLICATION

This application claims priority from Korean Patent Application No. 10-2016-0042204, filed on Apr. 6, 2016, which is hereby incorporated by reference for all purposes as if fully set forth herein.

BACKGROUND OF THE INVENTION

1. Field of the Invention

The present invention relates to a wide angle joint, and more specifically, to a wide angle joint for a vehicle that can minimize a shock caused by a reverse input and can reduce vibration and noise while decreasing wear.

2. Description of the Prior Art

In general, a universal joint is bent to about 35 degrees or less to transmit power, whereas a wide angle joint is bent to an angle ranging from about 60 degrees to about 70 degrees to transmit power.

The wide angle joint has a plate assembly installed inside a pair of coupling yokes and yoke shafts connected to opposite sides of an eccentric position on the plate assembly.

FIG. 1 is a sectional view schematically illustrating a general wide angle joint for a vehicle.

As illustrated in FIG. 1, the wide angle joint includes two yoke shafts 112 and 113 arranged to be inclined at a predetermined angle and a coupling yoke 111 installed therebetween.

As in a universal joint, yokes 112a and 111a articulating with each other are formed on facing sides of the yoke shaft 112 and the coupling yoke 111, respectively, and yokes 113a and 111b articulating with each other are formed on facing sides of the yoke shaft 113 and the coupling yoke 111, respectively. A cross-shaped spider 111c is installed between the yokes 112a and 111a, and a cross-shaped spider 111d is installed between the yokes 113a and 111b. Ball end portions 112b and 113b formed on the distal ends of the yoke shafts 112 and 113 are inserted into the coupling yoke 111.

A disk plate 114 may be inserted in the coupling yoke 111 that can be separated into two parts, and the two facing parts of the coupling yoke 111 may be coupled together by a fastening means, such as a bolt, etc.

The plate 114 has depressions in the middle of the opposite sides thereof and an annular eccentric groove 114a formed at an eccentric position on the outside thereof into which the ball end portions 112b and 113b of the yoke shafts 112 and 113 are inserted to rotate.

The above-configured wide angle joint in the related art has a problem in that wear of the plate and the coupling yoke is intensified on account of a shock caused by a reverse input from a road.

Further, the wide angle joint has a problem in that excessive wear of the plate may cause vibration and noise between the plate and the yoke coupling.

SUMMARY OF THE INVENTION

In this background, an aspect of the present invention is to provide a wide angle joint for a vehicle that can minimize a shock caused by a reverse input from a road and can reduce vibration and noise while decreasing wear.

Further, the aspect of the present invention is not limited thereto, and other unmentioned aspects of the present invention may be clearly appreciated by those skilled in the art from the following descriptions.

In accordance with an aspect of the present invention, there is provided a wide angle joint. The wide angle joint includes: a pair of yoke shafts mounted on opposite sides thereof to transmit power from the one side to the opposite side, each yoke shaft having a ball end portion provided on a first yoke part to which a spider is coupled; a plate having a large-diameter part formed in the middle thereof and protruding parts protruding from the large-diameter part in the opposite axial directions while being reduced in a radially inward direction, wherein the protruding parts have insertion recesses into which the ball end portions of the yoke shafts are inserted, and the large-diameter part is formed to have different widths in radial directions from the central portion thereof; and a pair of coupling yokes, each of which has a second yoke part connected with the first yoke part through the spider and a support recess into which the large-diameter part of the plate is inserted.

As described above, according to the present invention, the wide angle joint for a vehicle can minimize a shock caused by a reverse input from a road and can reduce vibration and noise while decreasing wear.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
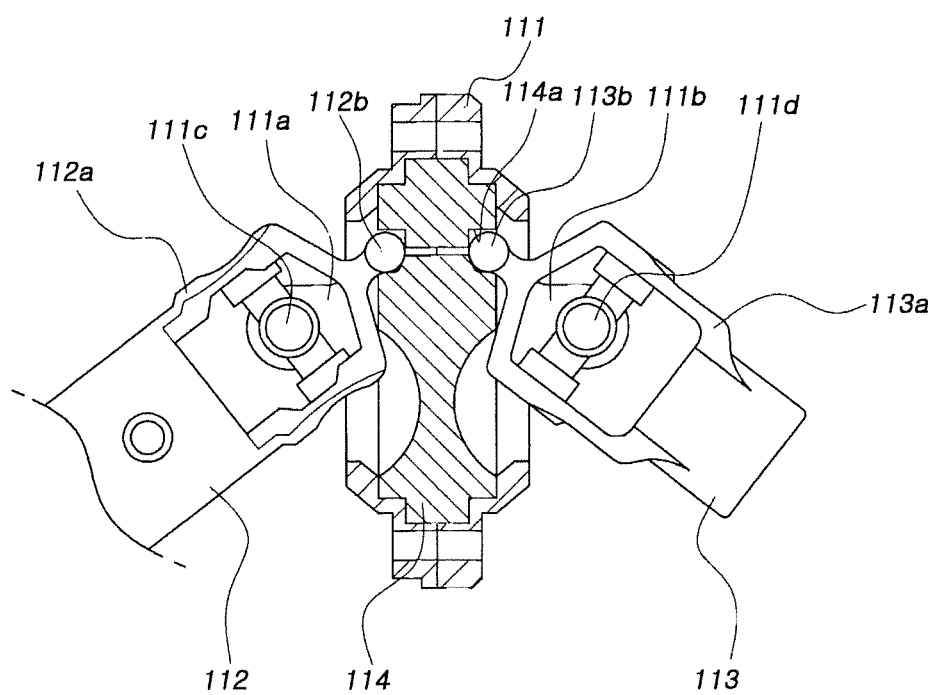
FIG. 1 is a sectional view schematically illustrating a general wide angle joint for a vehicle.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
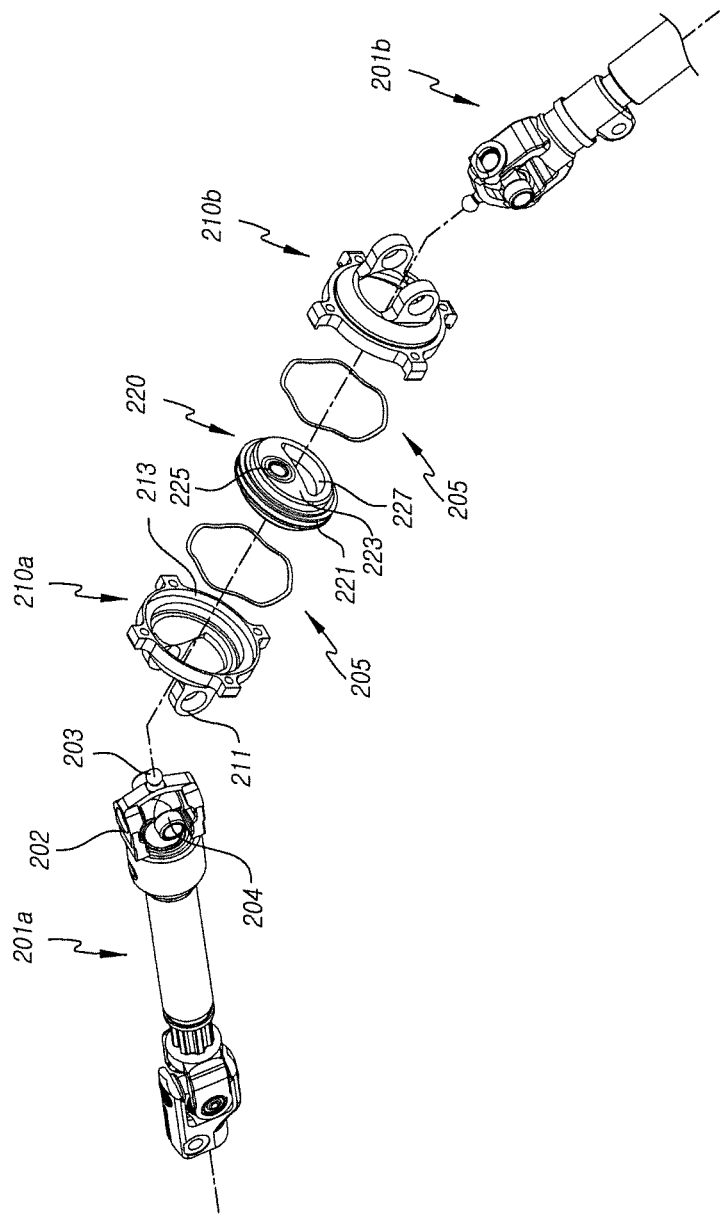
FIG. 2 is an exploded perspective view illustrating a wide angle joint according to one embodiment of the present invention.
Figure 3:
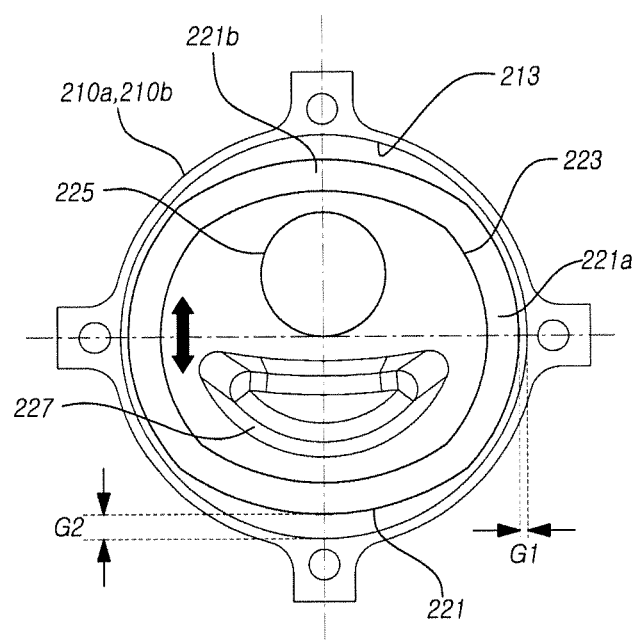
FIGS. 3 and 4 are front views illustrating a movement of a plate of the wide angle joint according to the embodiment of the present invention.
Figure 4:
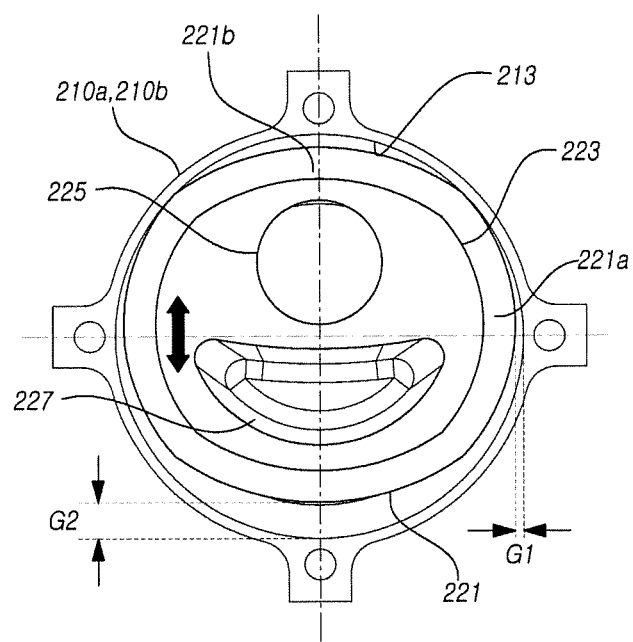
Figure 5:
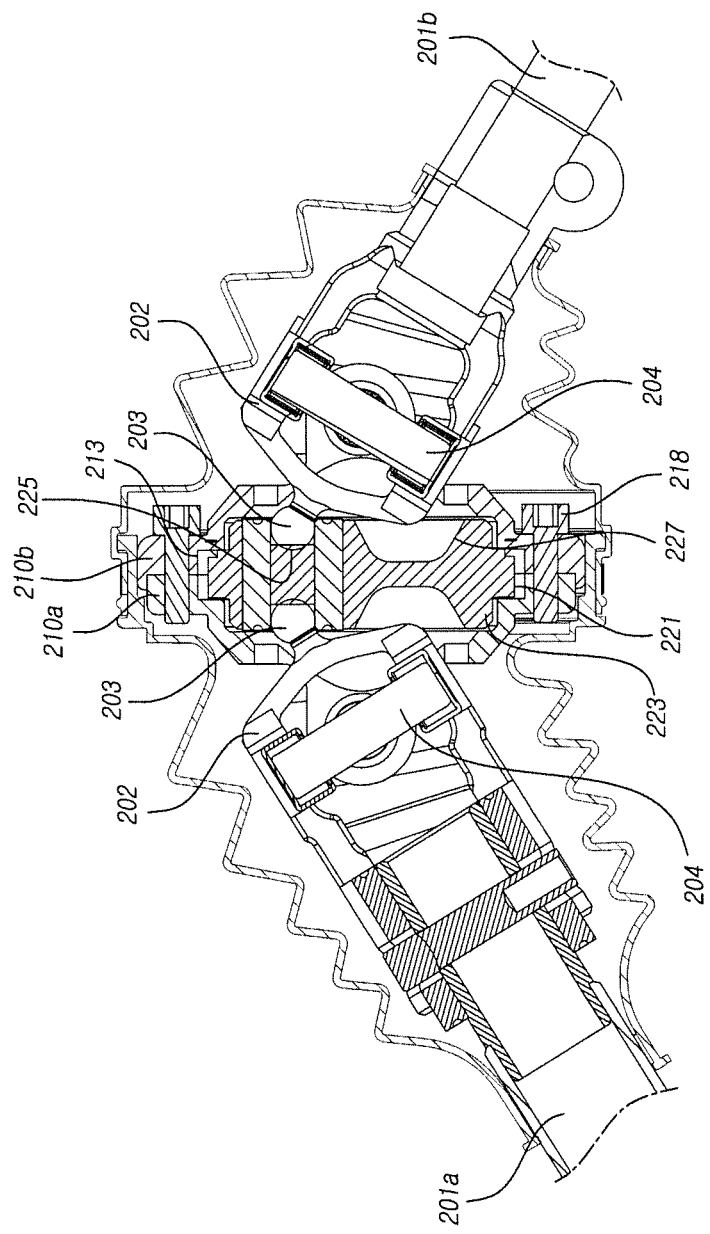
FIG. 5 is a sectional view illustrating the wide angle joint according to the embodiment of the present invention.
Figure 6:
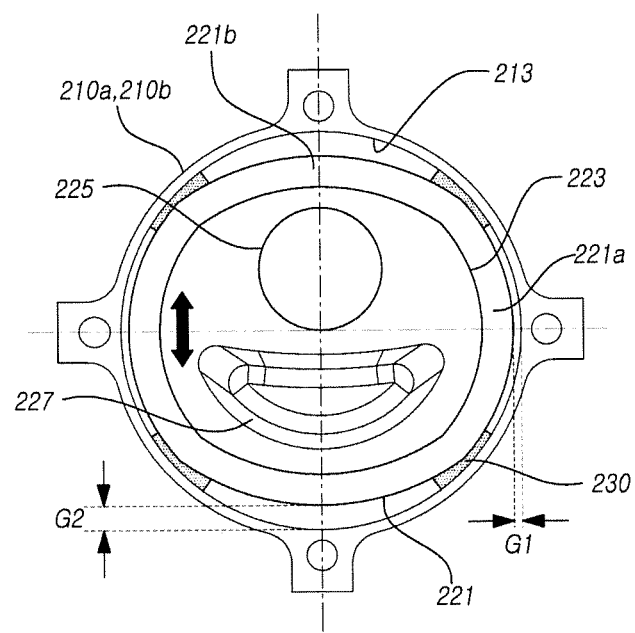
FIG. 6 is a front view illustrating the wide angle joint according to the embodiment of the present invention.

FIG. 2 is an exploded perspective view illustrating a wide angle joint according to one embodiment of the present invention. FIGS. 3 and 4 are front views illustrating a movement of a plate of the wide angle joint according to the embodiment of the present invention. FIG. 5 is a sectional view illustrating the wide angle joint according to the embodiment of the present invention. FIG. 6 is a front view illustrating the wide angle joint according to the embodiment of the present invention.

As illustrated in these drawings, the wide angle joint according to the embodiment of the present invention includes: a pair of yoke shafts 201a and 201b mounted on opposite sides thereof to transmit power from the one side to the opposite side, each yoke shaft having a ball end portion 203 provided on a first yoke part 202 to which a spider 204 is coupled; a plate 220 having a large-diameter part 221 formed in the middle thereof and protruding parts 223 protruding from the large-diameter part 221 in the opposite axial directions while being reduced in a radially inward direction, wherein the protruding parts 223 have insertion recesses 225 into which the ball end portions 203 of the yoke shafts 201a and 201b are inserted, and the large-diameter part 221 is faulted to have different widths in radial directions from the central portion thereof; and a pair of coupling yokes 210a and 210b, each of which has a second yoke part 211 connected with the first yoke part 202 through the spider 204 and has a support recess 213 into which the large-diameter part 221 of the plate 220 is inserted.

The pair of yoke shafts 201a and 201b are mounted on the opposite sides of the wide angle joint to transmit power from the one side to the opposite side. The yoke shafts 201a and 201b are coupled to opposite sides of the plate 220, respectively, by the ball end portions 203 having a ball shape and provided on end portions of the first yoke parts 202 to which the spiders 204 are coupled.

The plate 220 has the large-diameter part 221 formed in the middle thereof and the protruding parts 223 protruding from the large-diameter part 221 in the opposite axial directions while being reduced in a radially inward direction.

The protruding parts 223 on the opposite sides of the plate 220 have the insertion recesses 225, into which the ball end portions 203 of the respective yoke shafts 201a and 201b are inserted, and operating recesses 227 for avoiding interference with the yoke shafts 201a and 201b, and the large-diameter part 221 is formed to have different widths in radial directions from the central portion thereof.

The pair of coupling yokes 210a and 210b coupled together by fastening members 218 while surrounding the opposite sides of the plate 220 are approximately formed in a ring shape and have: the second yoke parts 211 protruding therefrom in the axial direction and connected with the first yoke parts 202 of the yoke shafts 201a and 201b through the spiders 204; and the support recesses 213 which are formed on the inner circumferential surfaces thereof and into which the large-diameter part 221 of the plate 220 is inserted.

Wave springs 205 coupled while being elastically deformed in the axial direction may be coupled between the opposite sides of the plate 220 and the inner surfaces of the coupling yokes 210a and 210b.

The large-diameter part 221 of the plate 220 is formed such that a radial gap is formed between the M outside surface of the large-diameter part 221 and the inner circumferential surfaces of the support recesses 213 of the coupling yokes 210a and 210b. Accordingly, when an excessive impulsive load is transmitted from an external road, the plate 220 can move to absorb the shock.

The large-diameter part 221 may include: a large-width portion 221a that forms the smallest gap G1 together with the support recesses 213 of the coupling yokes 210a and 210b; and a small-width portion 221b that forms the largest gap G2 together with the support recesses 213. The large-width portion 221a is formed to be symmetric with respect to the center of the plate 220, the small-width portion 221b is formed to be symmetric with respect to the center of the plate 220, and the width direction of the small-width portion 221b is perpendicular to the width direction of the large-width portion 221a.

That is, the large-diameter part 221 may be approximately formed in an oval shape having a gradually increasing radius of curvature from the large-width portion 221a to the small-width portion 221b. In this case, the large-width portion 221a is formed in the direction of the major axis of the oval, and the small-width portion 221b is formed in the direction of the minor axis of the oval.

When a shock is transmitted from an external road through the yoke shafts 201a and 201b, the plate 220 connected with the yoke shafts 201a and 201b absorbs the shock while moving in the support recesses 213 of the coupling yokes 210a and 210b.

Accordingly, when an excessive shock is transmitted to the yoke shafts 201a and 201b, the plate 220 may absorb the shock while moving in one direction in which the load is transmitted (in the upward direction in FIG. 4), as illustrated in FIG. 4, with the outer circumferential surface of the large-diameter part 221 making contact with the support recesses 213.

The large-diameter part 221 is not necessarily limited to the oval shape illustrated in the drawings, and any shape (for example, a rectangular shape) having different widths in radial directions from the central portion thereof can be applied to the large-diameter part 221.

The outer surfaces of connecting portions between the large-width portion 221a and the small-width portion 221b may be curved so that the outer circumferential surface of the large-diameter part 221 of the plate 220 can make surface-to-surface contact with the support recesses 213 of the coupling yokes 210a and 210b when being supported on the support recesses 213, which makes it possible to buffer a shock while reducing impulse and noise.

In addition, by forming the outer surfaces of the connecting portions (for example, corner portions in a case where the large-diameter part has a rectangular shape) between the large-width portion 221a and the small-width portion 221b into a curved surface shape, it is possible to reduce contact noise and impulse between the outer circumferential surface of the large-diameter part 221 of the plate 220 and the support recesses 213 of the coupling yokes 210a and 210b, and it is also possible to easily absorb a change in the angle that the yoke shafts 201a and 201b make, even when a rotational force, as well as an axial load, is applied to the yoke shafts 201a and 201b from an external road.

Dampers 230 formed of a resilient material may be coupled to the outer surfaces of the connecting portions between the large-width portion 221a and the small-width portion 221b of the plate 220, or may be coupled to the inner circumferential surfaces of the support recesses 213 corresponding to the connecting portions between the large-width portion 221a and the small-width portion 221b.

The dampers 230 may be formed of natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, silicone, or the like to have weather resistance and flexibility together with resilience and thus may serve as dampers for absorbing noise and vibration.

Accordingly, when a shock is transmitted from an external road, the dampers 230 formed of the aforementioned resilient material are first resiliently deformed while absorbing the shock, and thereafter the plate 220 makes contact with the support recesses 213, which makes it possible to absorb the shock and further reduce noise.

In FIG. 6 of the present invention, the aforementioned dampers 230 are illustrated as being formed on all of the four connecting portions between the large-width portion 221a and the small-width portion 221b. However, the present invention is not necessarily limited thereto, and a damper 230 may be only formed on one of the connecting portions, or two dampers may be formed in a diagonal direction.

The coupling yokes 210a and 210b are formed of metal, such as steel, sintered alloy, or aluminum alloy, since the coupling yokes 210a and 210b requires rigidity to bear a load caused by a movement and contact of the plate 220 in the support recesses 213.

The plate 220 may be formed of an engineering plastic based material, such as polyacetal (POM), polyamide (PA), polycarbonate (PC), polyimide (PI), polybutylene terephtalate (PBT), etc to absorb a shock and noise while moving in the support recesses 213 of the coupling yokes 210a and 210b.

As described above, according to the present invention, the wide angle joint for a vehicle can minimize a shock caused by a reverse input from a road and can reduce vibration and noise while decreasing wear.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | |
|---|---|
| 201a, 201b: Yoke shaft | 202: First yoke part |
| 203: Ball end portion | 205: Wave spring |
| 210a, 210b: Coupling yoke | 211: Second yoke part |
| 213: Support recess | 220: Plate |
| 221: Large-diameter part | 221a: Large-width portion |
| 221b: Small-width portion | 223: Protruding part |

What is claimed is:

1. A wide angle joint comprising:
a pair of yoke shafts mounted on opposite sides thereof to transmit power from one side to an opposite side, each yoke shaft having a ball end portion provided on a first yoke part to which a spider universal joint is coupled;
a plate having a large-diameter part formed in a middle thereof and protruding parts protruding from the large-diameter part in opposite axial directions while being reduced in a radially inward direction, wherein the protruding parts have insertion recesses into which the ball end portions of the yoke shafts are inserted, and the large-diameter part has different widths in different radial directions thereof; and
a pair of coupling yokes, each of which has a second yoke part connected with a respective one of the first yoke parts through the spider universal joint and a support recess into which the large-diameter part of the plate is inserted,
the large-diameter part has an outer radially circumferential surface that allows for a gap to extend around an entire radially circumferential periphery of the large-diameter part between the outer radially circumferential surface of the large-diameter part and inner circumferential surfaces of the pair of coupling yokes to allow radial movement of the large-diameter part in the support recess,
wherein the large-diameter part comprises a large-width portion that forms a smallest portion of the gap together with the support recesses and a small-width portion that forms a largest portion of the gap together with the support recesses,
the large-width portion includes large-width segments disposed symmetrically on radially opposite sides of the plate,
the small-width portion includes small-width segments disposed symmetrically on radially opposite sides of the plate, and a radial direction between the symmetrically disposed small-width segments is perpendicular to a radial direction between the symmetrically disposed large-width segments, and
dampers formed of a resilient material are coupled to outer surfaces of connecting portions between the large-width portion and the small-width portion, and disposed between the outer surfaces of the connecting portions and the inner circumferential surfaces of the pair of coupling yokes.

2. The wide angle joint of claim 1, wherein the large-diameter part is formed in a curved surface shape having a gradually increasing radius of curvature from the large-width portion to the small-width portion.

3. The wide angle joint of claim 1, wherein outer surfaces of connecting portions between the large-width portion and the small-width portion are formed in a curved surface shape.

4. The wide angle joint of claim 1, wherein an entire outer radially circumferential periphery of the large-diameter part of the plate, having the different widths in different radial directions, is curved.

5. A wide angle joint comprising:
- a pair of yoke shafts mounted on opposite sides thereof to transmit power from one side to an opposite side, each yoke shaft having a ball end portion provided on a first yoke part to which a spider universal joint is coupled;
- a plate having a large-diameter part formed in a middle thereof and protruding parts protruding from the large-diameter part in opposite axial directions while being reduced in a radially inward direction, wherein the protruding parts have insertion recesses into which the ball end portions of the yoke shafts are inserted, and the large-diameter part is formed to have different widths in different radial directions; and
- a pair of coupling yokes, each of which has a second yoke part connected with a respective one of the first yoke parts through the spider universal joint and a support recess into which the large-diameter part of the plate is inserted,
- wherein a radial gap is disposed between an outside surface of the large-diameter part and inner circumferential surfaces of the support recesses, and the large-diameter part comprises a large-width portion that forms a smallest portion of the radial gap together with the support recesses and a small-width portion that forms a largest portion of the radial gap together with the support recesses,
- the large-width portion includes large-width segments disposed symmetrically on radially opposite sides of the plate,
- the small-width portion includes small-width segments disposed symmetrically on radially opposite sides of the plate, and
- dampers formed of a resilient material are coupled to outer surfaces of connecting portions between the large-width portion and the small-width portion, and disposed between the outer surfaces of the connecting portions and inner circumferential surfaces of the support recesses of the coupling yokes.

6. A wide angle joint comprising:
- a pair of yoke shafts mounted on opposite sides thereof to transmit power from one side to an opposite side, each yoke shaft having a ball end portion provided on a first yoke part to which a spider universal joint is coupled;
- a plate having a large-diameter part formed in a middle thereof and protruding parts protruding from the large-diameter part in opposite axial directions while being reduced in a radially inward direction, wherein the protruding parts have insertion recesses into which the ball end portions of the yoke shafts are inserted, and the large-diameter part is formed to have different widths in different radial directions; and
- a pair of coupling yokes, each of which has a second yoke part connected with a respective one of the first yoke parts through the spider universal joint and a support recess into which the large-diameter part of the plate is inserted,
- wherein a radial gap is disposed between an outside surface of the large-diameter part and inner circumferential surfaces of the support recesses, and the large-diameter part comprises a large-width portion that forms a smallest portion of the radial gap together with the support recesses and a small-width portion that forms a largest portion of the radial gap together with the support recesses,
- the large-width portion includes large-width segments disposed symmetrically on radially opposite sides of the plate,
- the small-width portion includes small-width segments disposed symmetrically on radially opposite sides of the plate, and
- dampers formed of a resilient material are coupled to the inner circumferential surfaces of the support recesses of the coupling yokes that correspond to connecting portions between the large-width portion and the small-width portion, and are disposed between the inner circumferential surfaces of the support recesses of the coupling yokes and outer surfaces of the connecting portions.

* * * * *